Dec. 6, 1955  J. R. MOORE  2,726,385
DOUBLE LOBE PULSE ECHO LOCATOR DISPLAY
Filed Nov. 28, 1942  2 Sheets-Sheet 1
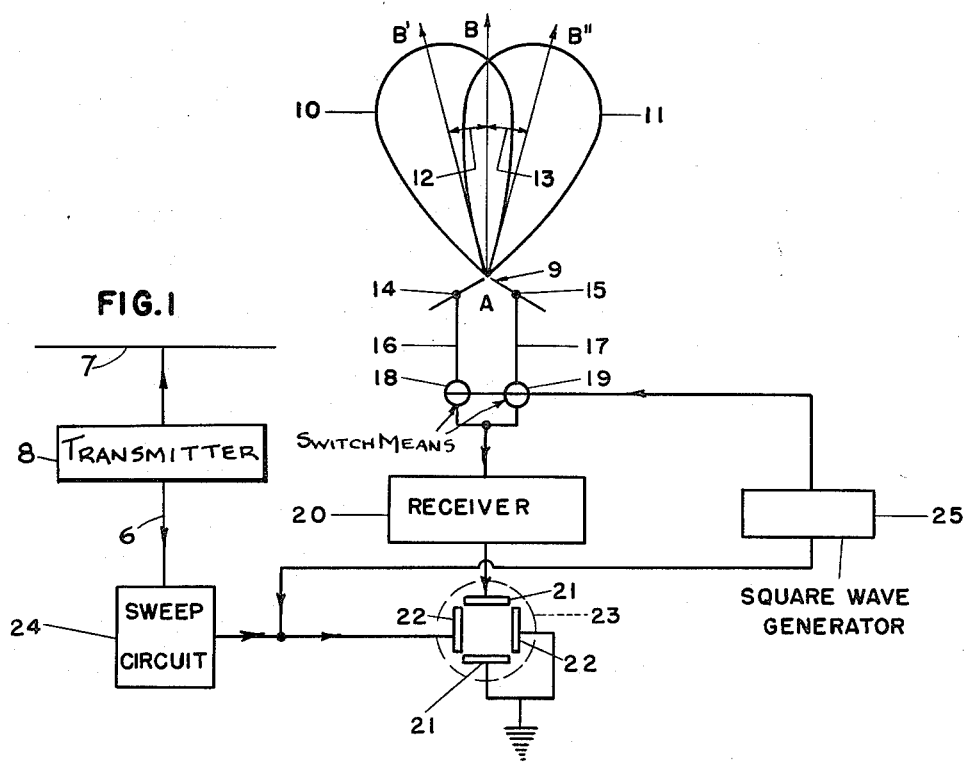
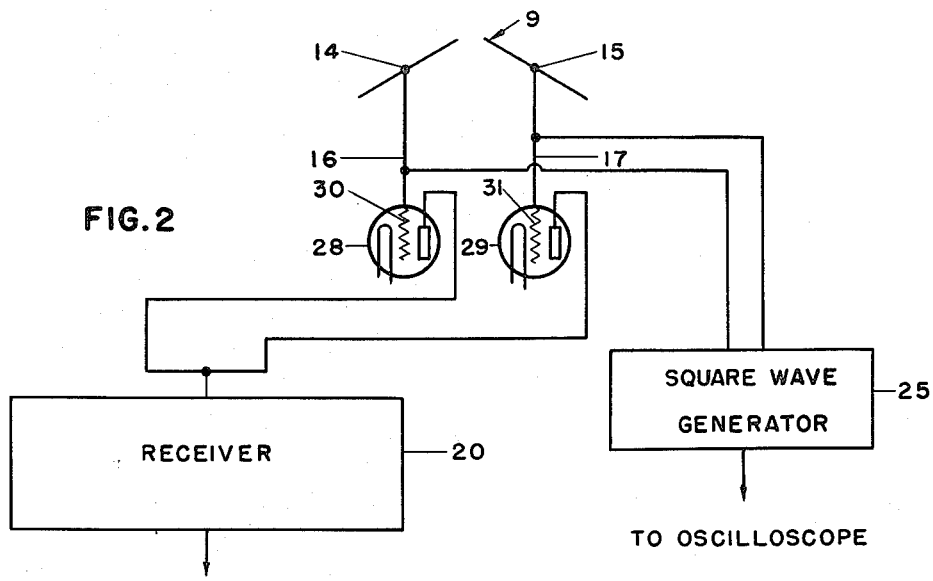
INVENTOR
JAMES R. MOORE
BY William D. Hall
ATTORNEY Dec. 6, 1955  J. R. MOORE  2,726,385
DOUBLE LOBE PULSE ECHO LOCATOR DISPLAY
Filed Nov. 28, 1942  2 Sheets—Sheet 2

INVENTOR
JAMES R. MOORE
BY William D. Hall
ATTORNEY

United States Patent Office 2,726,385
Patented Dec. 6, 1955

2,726,385

DOUBLE LOBE PULSE ECHO LOCATOR DISPLAY

James R. Moore, Rumson, N. J., assignor to the United States of America as represented by the Secretary of War Application November 28, 1942, Serial No. 467,266

8 Claims. (Cl. 343—16)

(Granted under Title 35, U. S. Code (1952), sec. 266)

The invention described herein may be manufactured and used by or for the Government for governmental purposes, without the payment to me of any royalty thereon.

This invention relates to improvements in the pulse echo determination of the bearing of objects. More particularly, it relates to a system wherein the determination is made by what may be conveniently called "double tracking."

Pulse echo detector systems are known wherein means are employed for receiving and amplifying a signal echo from a reflecting surface or object and impressing the amplified signal on an indicator such as a cathode ray oscilloscope for visual observation of the magnitude of the base line deflection produced thereby. In the known systems, the determination of the position of the object depends on the observer's recognition and his evaluation of a single deflection maximum.

One of the major difficulties inherent in the old methods is the fact that no standard of comparison of the deflection is provided whereby the instantaneous amplitude of the deflection may be judged to be a maximum, thus apprising the observer of the fact that an "on target" situation has been obtained. A defect of no lesser importance is the fact that amplitude variations of the echo are produced by variations in general reception conditions as well as by receiver and transmitter instability. Such spurious effects obviously introduce serious tracking errors. It is therefore a part of this invention to overcome the foregoing difficulties, and more specifically, to provide a method of tracking wherein the determination of "on target" or "off target" conditions is independent of the absolute magnitude of the echo deflection height.

I accomplish this by obtaining two separate responses which vary oppositely in height as the antenna is swung relative to the target. In this way a plurality of indications are obtained from a single target and may be simultaneously compared for equality, this being the most convenient indication for an "on target" condition.

A further object of this invention is to facilitate the comparison of the said two indications and more specifically, to produce two indications which are disposed side by sdie immediately adjacent one another for comparison of their height.

A still further object is to provide means whereby a continuous useful flow of information concerning the "on" and "off target" status of the apparatus may be obtained. Still another object of my invention is to provide a response or indication which has "sense," that is, which will indicate whether the apparatus is "off target" to the right or to the left, so that correction of the direction of the line of sight may be understaken immediately and in the proper direction.

The invention may best be understood by referring to the drawing in which:

Fig. 1 is a schematic diagram illustrating an embodiment of my invention;

Fig. 2 is a somewhat more detailed diagram of the switching means as embodied in the preferred form of my invention;

Figure 3:
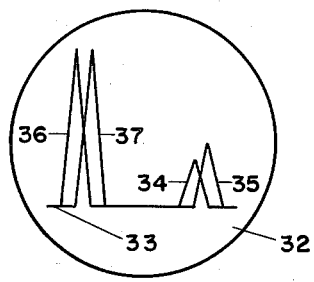
Fig. 3 is a view of the screen of an oscilloscope showing the projected picture obtained when the apparatus is "off target" and to the right of the same.

Referring to Fig. 1 of the drawing, 9 generally designates a movable antenna array or the like having divergent and overlapping directional response patterns 10, 11. Said patterns are preferably symmetrical each to each and possess lines of maximum response AB' and AB'' which form equal angles 12, 13 with the axis of symmetry AB. The array 9 may comprise two sets of dipoles and reflectors associated therewith, which sets may be oriented at a predetermined angle with each other.

The antenna array 9 is tapped at the output point 14, 15 corresponding to the response patterns 10, 11 respectively, and the output is fed by means of the transmission lines 16, 17 through the switching means 18, 19 to a receiver 20. The output of the receiver 20 is in turn connected to the vertically deflecting plates 21 of an oscilloscope 23. The horizontally deflecting plates 22 of said oscilloscope are energized by a combined saw tooth and square wave voltage, the components of which are respectively developed in the sweep circuit 24, and the square wave generator 25. Transmitter 8 includes means for producing short pulses of high frequency energy which are radiated by a suitable directional antenna 7 as is known in the art. A connection 6 from the timing circuit of the transmitter provides a pulse to trigger the sweep circuit into action at the instant each transmitted pulse is emitted.

The switching means 18, 19 may be of the mechanical, electronic, or any other well known type for the same purpose. Said means are so connected and arranged as to alternately and at a predetermined switching frequency feed the output of each antenna array 14 or 15 to the receiver 20. This switching frequency may be a fraction of the pulse frequency. Coordinated with the switching means 18, 19 is the square wave generator 25, whose output wave is of a form shown in Fig. 7. Said square wave generator feeds the positive portion 27 of its output to the horizontally deflecting plates 22 of the oscilloscope while one of the switching means 18 or 19 is blocked, and then feeds the negative portion 26 of the cycle to the same plates when the other switching means is blocked.

The switching tubes 28, 29 are preferably of the electron tube type, as shown in Fig. 2. Each of the tubes is adapted, as by the use of suitable bias means, to be intermittently blocked by the square wave voltage output of the generator 25. Said voltage is applied to the grids 30, 31 of the switch tubes 28, 29, and drives the grid of one of these tubes, say tube 28, beyond cutoff for one half cycle, so that said tube 28 is non-conducting. Simultaneously, however, the other tube 29 is made conductive and so amplifies the signal from its input channel and makes one or more pulses available to the receiver 20. During the next half cycle, the action of the switch tubes is reversed. It is obvious, therefore, that the receiver 20 is actuated in succession by the signals or pulses from one channel and then by those from the other. The square wave impressed on the grids of the electronic switching tubes 28, 29 is synchronous with or it may be identical with that placed on the horizontally deflecting plates 22 of the oscilloscope, as hereinbefore described. The same source of square waves may be used for both purposes.

Figure 4:
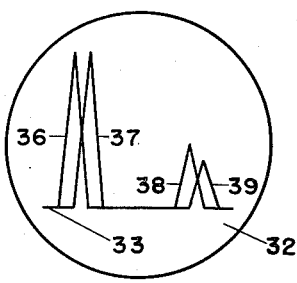
Fig. 4 is another view of the screen showing the projected picture obtained when the apparatus is "off target" to the left.
Figure 5:
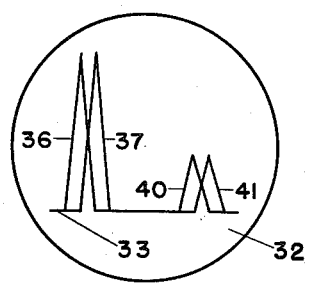
Fig. 5 is still another view of the screen showing the "on target" picture.

Figs. 3, 4 and 5 illustrate the form of the images produced on the screen 32 of the cathode ray oscilloscope 23 (Fig. 1) when the spread voltage and the saw tooth wave are simultaneously applied to the horizontally deflecting plates 22 and the signal output of the receiver 20 is applied to the vertically deflecting plates 21. The formation of said images is hereinafter explained.

Figure 6:
Fig. 6 shows one form of sweep wave which may be used to produce a linear time base on the oscilloscope screen.
Figure 7:
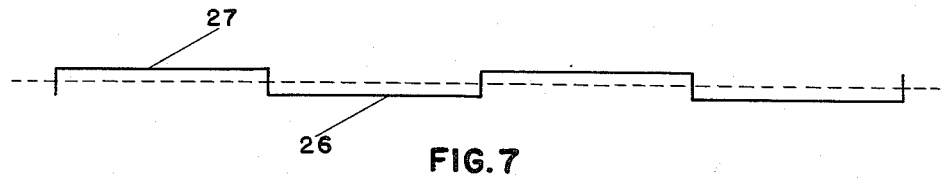
Fig. 7 illustrates a square wave which may be employed, first, to block the switching means, and second, as a spread voltage applied to the horizontal deflection plates of the oscilloscope.
Figure 8:
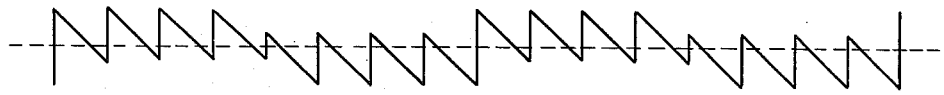
Fig. 8 shows the resultant wave form obtained when the waves of Figs. 6 and 7 are combined.

When a conventional saw tooth sweep voltage of form shown in Fig. 6 and a square wave or "spread" voltage of form shown in Fig. 7 are simultaneously applied to the horizontally deflecting plates 22 as above described, the combined sweep wave form becomes that illustrated in Fig. 8. Because it is the output of the square wave generator 25 (Fig. 1) which serves the dual function of blocking the electronic switches 28, 29 and biasing the sweep circuit output, the frequency of antenna switching is equal to that of the spread voltage applied to the horizontally deflecting plates. Hence, the pulse signals from one antenna channel appear on the screen 32 as a deflection 40 (Fig. 5) which is laterally displaced slightly to the left of its normal position, while the pulse signals from the other antenna channel appear on said screen as another deflection 41 which is laterally displaced slightly to the right of its normal position, as shown in Fig. 5.

In passing, it may be explained that the large deflections 36, 37 of the base line 33 are the split-image representation of the locally transmitted pulse which is being projected toward the target from the transmitter.

The operation of the device in the so-called "double tracking" process is as follows: A pulse of ultra high frequency radio waves is projected toward the target and simultaneously therewith the saw tooth generator 24 (Fig. 1) is triggered into operation, producing the linear time base 33 (Fig. 5) on screen 32 of the oscilloscope. A portion of the ultra high frequency energy reflected from said target is picked up on the antenna array 9 (Fig. 1), the amplitude of the received signal being dependent, among other factors, upon the angular relationship between the target and the receiver antenna array. Hence, the amplitude of the signals incident at the output points 14, 15 are related to the angle between the direction of the target and the line of maximum reception AB' or AB" of the respective lobes 10 or 11. Since the lobes are bi-directionally arranged on either side of the axis of symmetry AB, it is obvious that only when the line of sight direction to the target coincides with said axis of symmetry will the signals received by the individual portions of the antenna array and the consequent currents fed through the receiver to the oscilloscope be equal to each other. However, since the outputs at the points 14, 15 are alternately fed through receiver 20 to the vertically deflecting plates of the oscilloscope and simultaneously and in synchronism therewith the spread voltage from the generator 25 is applied to the horizontally deflecting plates of the oscilloscope, two colinear partially overlapping echo images are projected on the screen of said oscilloscope, as shown in Fig. 5.

The heights of the echo images, being proportional to the aforementioned amplitudes of the signals tapped from the output points 14, 15, will be unequal in the event the apparatus is "off target." The image of greater height indicates that the reception at the corresponding input point is a signal of greater amplitude, and vice versa, as is illustrated in Figs. 3 and 4. The observer can thus determine the "on" or "off target" position of the antennae array by comparing the heights of the echo images on the oscilloscope screen. If the target is in the direction of the axis of symmetry AB, the echo images 40, 41 (Fig. 5) are of equal height, as above mentioned.

In tracking the object, the antenna array is rotated about a fixed vertical axis of rotation for a complete scanning of the space surrounding the apparatus. I have not shown or described specific means for rotating the array, it being understood that any conventional means to produce the movement may be employed. Also, if desired, the apparatus may be used in duplicate, one for scanning horizontally and the other for scanning vertically. By combining the results of the two sets, a complete coverage of the surrounding space is obtained. Upon the appearance on the oscilloscope screen of the split image echo, the movement of the antenna array is restricted and confined to the sector of interest. While the target is being tracked the height of one image will be increasing and that of the other will be decreasing. The relative height of the images are thus indicative of the direction and the magnitude of the "off target" position. When the split images 40, 41, of the echo are of equal height as shown in Fig. 5, the apparatus is "on target."

By suitable connections of the spread controls to the transmission line from the antennae, it is possible to arrange matters so that when the target is to the right of the direction AB the right image 35 is higher than the left image 34 as shown in Fig. 3, while when the target is to the left of the direction AB, the left image 38 is higher as shown in Fig. 4. This is a convenient working arrangement for manual operation or aiming of the antenna array for the antenna is thus rotated in the direction of the lower peak.

In the terminology used herein for convenience, the term "synchronized" is used with reference to the transmitted pulses or the received echo signals although not of identical phase. Actual simultaneous occurrences such as the echoes received over the two antenna channels or the spread or selection controls are referred to as "synchronous."

While I have thus shown a preferred embodiment of my invention, it is obvious that numerous changes and modifications may be made without departing from the spirit thereof as defined in the following claims.

I claim:

1. In a pulse echo system for detecting objects, a plurality of conjointly movable directional antennae possessing divergent partially overlapping response patterns; a receiver; switching means for connecting said antennae in predetermined order at a certain frequency to said receiver; a cathode ray indicator having a pair of vertically deflecting plates and a pair of horizontally deflecting plates; a sweep circuit adapted to place a time base on said horizontally deflecting plates; means connecting the signal output of said receiver to said vertically deflecting plates to produce a plurality of normal displacements of a relatively small portion of said time base; means generating a square wave of the aforementioned frequency; and means for impressing said square wave on said horizontally deflecting plates to produce a spacing of said plurality of normal displacements along said time base.

2. In an apparatus for the double tracking of objects by a pulse echo system, a pair of directional antennae; a receiver; a pair of electron tube switches alternately connecting the signal output of each of said antennae to said receiver; means generating a square wave, said wave operating said switches; a cathode ray oscilloscope having horizontally and vertically deflecting plates and a fluorescent screen; a sweep circuit connected to said horizontally deflecting plates describing a linear time base on said screen; and means feeding the output of said receiver to said vertically deflecting plates producing visual indications of said signals on said time base, said square wave being connected to said horizontally deflecting plates 3. Apparatus for double tracking objects by pulse echo means comprising a pair of directional antennae; a receiver; a pair of electronic switches alternately connecting the signal output of each of said antennae to said receiver; means generating a square wave for operating said switches; a fluorescent screen cathode ray oscilloscope having horizontally and vertically deflecting plates; sweep circuit means generating a saw tooth wave; means for impressing said square and said saw tooth waves on said horizontally deflecting plates, the combined waves causing recurrent colinear overlapping time bases on said screen; and means feeding the output of said receiver to said vertically deflecting plates producing visual indications on said screen of said signals at the same relative positions on each of said bases.

4. In a pulse echo object locating system, means to transmit successive pulses toward an object, receiver input means having a plurality of sensitivity lobes diverging slightly from a mean axis of sensitivity intended to be directed toward said object, switch means to control said input means to alternately utilize said plurality of lobes, a receiver responsive to the magnitude of echoes in said input means; time sweep means synchronized with said transmitted pulses, time sweep modifying means actuated by said switch means to modify the output of said time sweep means synchronously with the control of said input means; an indicator having a time sweep coordinate responsive to said modified output and a deflection sweep coordinate responsive to said receiver output, whereby echoes received over said divergent lobes will be separated along said time sweep coordinate to facilitate comparison of their magnitudes and the pointing of said mean axis toward an object to establish its direction.

5. In a pulse echo object locating system, means to transmit successive pulses toward an object and receive echoes therefrom, having a plurality of sensitivity lobes diverging slightly from a mean axis of sensitivity intended to be directed toward a target, switch means to control said means to alternately utilize said plurality of lobes, a receiver responsive to the magnitude of echoes; time sweep means synchronized by said transmitted pulses, time sweep modifying means actuated by said switch means to modify the output of said time sweep means synchronous with said control; an indicator having a time coordinate responsive to said modified output and a deflection sweep coordinate responsive to said receiver, whereby echoes received over said divergent lobes will be separated along said time sweep coordinate to facilitate comparison of their magnitudes and the pointing of said mean axis toward an object to establish its direction.

6. A system for comparing the amplitudes of a synchronous plurality of repetitive series of pulse signals comprising: an indicator having a time sweep coordinate and a deflection coordinate; time sweep means synchronized to said signals having an output to provide a principal control of said time sweep coordinate; means to select signals successively from each of said series for controlling said deflection coordinate in accordance with the amplitude of said signals, and synchronously with such selection to provide a modifying control of the output of said time sweep means; whereby similarly deflected laterally shifted visual indications are provided for ready comparison of the amplitudes of said signals.

7. A system for comparing the amplitudes of a synchronous plurality of repetitive series of pulse signals comprising: an indicator having a time sweep coordinate and a deflection coordinate; means to select signals successively from each of said series for controlling said deflection in accordance with the amplitude of said signals, and means to provide a time sweep synchronized to said signals and modified synchronously with said selection means; whereby similarly deflected laterally shifted visual indications are provided for ready comparison of the amplitudes of said signals.

8. A system for comparing the amplitudes of a synchronous plurality of repetitive series of pulse signals comprising: an indicator having a time sweep coordinate and a deflection coordinate; means to provide a time sweep in the direction of said time sweep coordinate; means to select signals successively from each of said series which control said deflection coordinate in accordance with the amplitude of said signals, and synchronously with said selection to modify the position of the deflections representative of said signals in the same direction as said time sweep coordinate; whereby similarly deflected laterally shifted visual indications are provided for ready comparison of the amplitudes of said signals.

References Cited in the file of this patent

UNITED STATES PATENTS

| | | |
|---|---|---|
| 1,892,220 | Runge | Dec. 27, 1932 |
| 1,892,431 | Hammond | Dec. 27, 1932 |
| 1,981,350 | Engel | Nov. 20, 1934 |
| 2,083,242 | Runge | June 8, 1937 |
| 2,109,475 | Fanning | Mar. 1, 1938 |
| 2,189,549 | Hershberger | Feb. 6, 1940 |
| 2,231,929 | Lyman | Feb. 18, 1941 |
| 2,312,203 | Wallace | Feb. 23, 1943 |